United States Patent [19]

Lange et al.

[11] Patent Number: 4,674,065
[45] Date of Patent: Jun. 16, 1987

[54] SYSTEM FOR DETECTING AND CORRECTING CONTEXTUAL ERRORS IN A TEXT PROCESSING SYSTEM

[75] Inventors: Frederick R. Lange, Mt. Airy; Walter S. Rosenbaum, Bethesda, both of Md.

[73] Assignee: International Business Machines Corporation, Armonk, N.Y.

[21] Appl. No.: 807,769

[22] Filed: Dec. 10, 1985

Related U.S. Application Data

[63] Continuation of Ser. No. 373,543, Apr. 30, 1982, abandoned.

[51] Int. Cl.$^4$ ............................. G06K 9/00; G06F 7/28
[52] U.S. Cl. ..................................... 364/900; 364/518; 382/40; 382/57; 400/63; 400/74
[58] Field of Search ... 364/200 MS File, 900 MS File, 364/518, 419; 382/40, 57; 400/63, 74

[56] References Cited

U.S. PATENT DOCUMENTS

| | | | |
|---|---|---|---|
| 3,969,700 | 7/1976 | Bollinger et al. | 382/40 |
| 4,058,795 | 11/1977 | Balm | 382/40 |
| 4,136,395 | 1/1979 | Kolpek et al. | 384/40 |
| 4,255,796 | 3/1981 | Gabbe et al. | 364/900 |
| 4,270,182 | 5/1981 | Asija | 364/900 |
| 4,277,644 | 7/1981 | Levinson et al. | 381/43 |
| 4,308,582 | 12/1981 | Berger | 364/300 |
| 4,424,575 | 1/1984 | Clarke et al. | 364/900 |
| 4,456,973 | 4/1982 | Carlgren et al. | 364/900 |

OTHER PUBLICATIONS

"Data Validation and Correction by Content" written by Shipway & Tricker, IBM Tech. Discl. Bull., vol. 14, No. 4, 9/71, pp. 1132-1137.
"Writer's Workbench: Computer Aids for Text Analysis", IEEE Transactions on Communications, vol. COM-30 (1982), Jan. No. 1, pp. 105-110.
"Computer Programs for Detecting and Correcting Spelling Errors", Communications of the ACM, vol. 23, Dec. 1980, No. 12, pp. 676-687.

Primary Examiner—Eddie P. Chan
Attorney, Agent, or Firm—John W. Henderson, Jr.; Douglas H. Lefeve

[57] ABSTRACT

A system for automatically proofreading a document for word use validation in a text processing system is provided by coupling a specialized dictionary of sets of homophones and confusable words to sets of di-gram and N-gram conditions whereby proper usage of the words can be statistically determined. A text document is reviewed word-by-word against a dictionary of homophones and confusable words. When a match occurs, the related list of syntactic rules is examined relative to the context of the subject homophone or confusable word. If the syntax in the immediate context of the homophone or confusable word conflicts with the pre-stored syntax rules, the homophone or confusable word is highlighted on the system display. The system then displays the definition of the highlighted word along with possible intended alternative forms and their respective definitions. The operator can examine the word used and the possible alternatives and make a determination as to whether an error has been made and if a correction of the text is required. If correction is required, the operator may cause the error word to be replaced by the desired word by positioning the display cursor under the desired word and depressing an appropriate key on the system keyboard.

6 Claims, 6 Drawing Figures

```
         1         2         3         4         5         6         7
8901234567890123456789012345678901234567890123456789012345678901234567890123456789
```

TO: MR. JOHN JONES

IBM NEW YORK

MR. JONES,

THE LETTER YOU ARE NOW READING HAS BEEN PROCESSED BY AN AUTOMATIC PROOFREADING FUNCTION. THE INTERNAL DICTIONARY COVERS BUSINESS, LEGAL, AND MEDICAL TERMINOLOGY. AS YOU CAN SEE, IF A WORD IN THE DOCUMENT IS MISUSED, IT IS HIGHLIGHTED ON THE DISPLAY SCREEN. THIS PROVIDES ASSISTANCE TO THE PRINCIPAL OR SECRETARY WHO IS CREATING OR PROOFREADING A DOCUMENT. ALL WORD ENTRIES ARE ALSO CHECKED FOR SPELLING ERRORS AND HYPHENATION POINTS ARE PROVIDED FOR FORMATTING.

AN AFFECT OF THIS FUNCTION IS THAT THE TIME NECESSARY TO MANUALLY SCAN A DOCUMENT FOR ERRORS IS GREATLY REDUCED.

I AM CONFIDANT THAT THE SYSTEM WILL BE OF GREAT ASSISTANCE TO YOU.

OF COARSE, NEXT TIME THAT YOU ARE IN THE GAITHERSBURG AREA, PLEASE STOP BY.

SINCERELY YOURS,

W. ROSENBAUM

TO: MR. JOHN JONES

IBM NEW YORK

MR. JONES,

THE LETTER YOU ARE NOW READING HAS BEEN PROCESSED BY AN AUTOMATIC PROOFREADING FUNCTION. THE INTERNAL DICTIONARY COVERS BUSINESS, LEGAL, AND MEDICAL TERMINOLOGY. AS YOU CAN SEE, IF A WORD IN THE DOCUMENT IS MISUSED, IT IS HIGHLIGHTED ON THE DISPLAY SCREEN. THIS PROVIDES ASSISTANCE TO THE PRINCIPAL OR SECRETARY WHO IS CREATING OR PROOFREADING A DOCUMENT. ALL WORD ENTRIES ARE ALSO CHECKED FOR SPELLING ERRORS AND HYPHENATION POINTS ARE PROVIDED FOR FORMATTING.

AN AFFECT OF THIS FUNCTION IS THAT THE TIME NECESSARY TO MANUALLY SCAN A DOCUMENT FOR ERRORS IS GREATLY REDUCED.

```
┌─────────────────────────────────────────┐
│  AFFECT - ACT UPON OR INFLUENCE         │
│  EFFECT - RESULT OF ACTION OR TO BRING  │
│           ABOUT                         │
└─────────────────────────────────────────┘
```

I AM CONFIDANT THAT THE SYSTEM WILL BE OF GREAT ASSISTANCE TO YOU.

OF COARSE, NEXT TIME THAT YOU ARE IN THE GAITHERSBURG AREA, PLEASE STOP BY.

SINCERELY YOURS,

W. ROSENBAUM

FIG. 6

SYSTEM FOR DETECTING AND CORRECTING CONTEXTUAL ERRORS IN A TEXT PROCESSING SYSTEM

This application is a continuation of application Ser. No. 373,543 filed Apr. 30, 1982, now abandoned.

TECHNICAL FIELD

This invention relates to text processing systems and more particularly to methods in text processing systems for automatically detecting and correcting contextual errors related to confusable words in text.

BACKGROUND ART

With the advent of office systems and the improvements in computing power and storage, it becomes appropriate to consider various applications which offer the operator the benefit of the system scanning documents to find anomalies and possible errors in the text. It has been posed in the prior art that computer systems review documents and compute a "foggyness factor" for the respective sentences, paragraphs and chapters. This advises the operator on a high level how consistent and in a bulk manner infers how lucid a composition is. Such "foggyness factors" derive their inference based on a correlation against sentence length, number of punctuations, length of words and other superficial factors. The technology does not necessarily say something is wrong, but rather how far from a postulated ideal the author's composition style is.

Another known method for examining text for errors is to scan the document and check each word against a spelling dictionary to detect misspelled words. A technology suitable for miniprocessor implementation and consistent with office system technology is disclosed in the "Digital Reference Matrix For Word Verification", U.S. Pat. No. 3,995,254, issued Nov. 30, 1976 to W. S. Rosenbaum. This technology determines if a word is misspelled but not whether it is misused. No intelligence is exercised about the word, rather only about its character content.

A simple method for examining a document with contextual significance is to examine each word in the document against a dictionary composed of homophones or confusable words. Each time a word in the dictionary is encountered in the document, it is flagged and brought to the operator's attention for manual review, and if necessary, corrective intervention.

However, a major detraction of such content analysis is that for such common homophones or confusable forms as, there/their, fore/four/for, to/too/two, etc. the noise level of successive flagged words, regardless of the obviousness of their correct usage, is more of a nuisance factor than a remedial composition aid. The ability to automatically detect homophones and confusion prone words that appear to be syntactically mismatched and only prompt the operator with those suspicious cases has not been addressed in the prior art.

BRIEF SUMMARY OF THE INVENTION

It has been discovered that improved text proofing for purposes of word use validation in a text processing system can be achieved by coupling a specialized dictionary of sets of homophones and confusable words where each word has related to it a set of word di-gram or N-gram conditions whereby proper or improper usage of the words can be statistically determined. This system is dictionary-driven and the operator's composition is reviewed word-by-word against the dictionary of homophones and confusable words. When a match is found against the dictionary, the related list of syntactic word N-grams is examined relative to the immediate region of text where the subject homophone or confusable word is found. If the syntax in the immediate context of the homophone or confusable word conflicts with the prestored N-gram word conditions, the homophone or confusable word is flagged for the operator on the system display. In an appropriate region of the display screen, the definition of the flagged homophone or confusable word is shown along with the spelling of the possibly intended alternate forms with their respective definitions. The operator can then examine the word used and the possible alternatives indicated with their respective definitions and make the final determination as to whether an error has been made and if a correction of the text is required. If correction is required, the operator can cause the error word to be replaced by the desired word by positioning the display cursor under the desired word and depressing the appropriate key on the system keyboard.

BRIEF DESCRIPTION OF DRAWINGS

FIG. 5 illustrates the presentation of a text document on the display screen of FIG. 4; and FIG. 6 illustrates the display of the document as it would appear on the display device during operation of the proofreading function of the present invention.

BEST MODE FOR CARRYING OUT THE INVENTION

Figure 1:
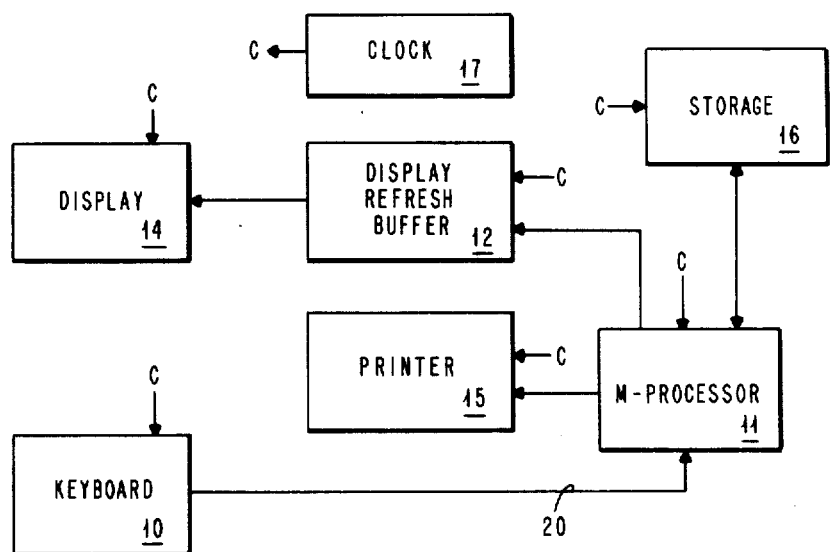
FIG. 1 is a block diagram of an interactive text processing system embodying the present invention.

The invention will now be described as embodied in an interactive text processing system of the type shown in FIG. 1. As shown in FIG. 1, the text processing system illustrated therein comprises a keyboard 10, a microprocessor 11, a display refresh buffer 12, a display device 14, a printer 15, and an auxiliary direct access storage device 16 such as a disk or diskette drive. A clock 17, for keeping the various components of the system in synchronism, is also shown in FIG. 1 and is effectively coupled to each of the units.

Keyboard 10 comprises a normal set of graphic symbol keys such as letters, numbers, punctuation marks, and special character keys, plus text format or control keys including carriage return, tab, index, etc. In addition, the keyboard 10 includes a second set of control keys for issuing special control commands to the system. The control keys include cursor movement keys, keys for setting the keyboard 10 into a number of different modes, etc.

Figure 2:
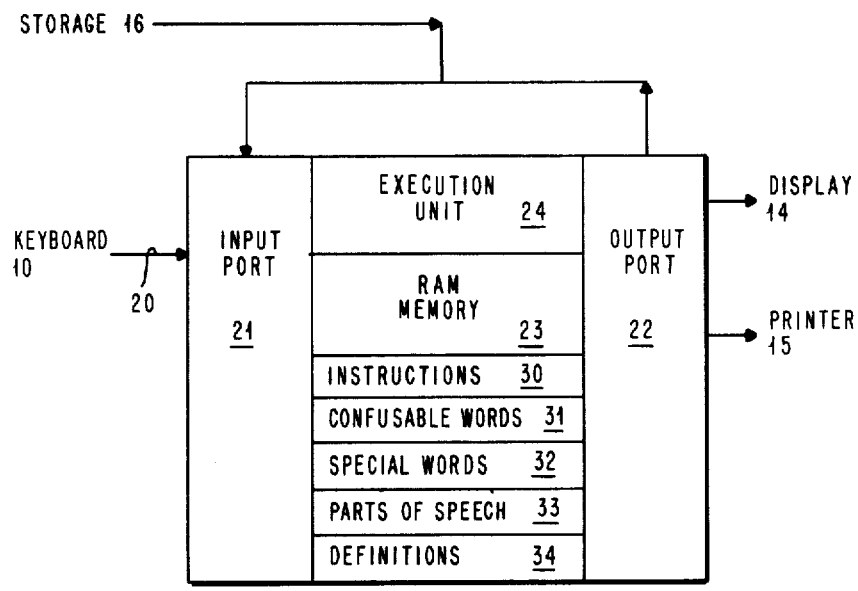
FIG. 2 is a functional diagram of the microprocessor shown in FIG. 1.

The keyboard 10 is connected to the microprocessor 11 by means of a bus 20. The microprocessor 11, as shown in FIG. 2, comprises an input port 21, an output port 22, a random access memory 23, and a process execution unit 24.

Figure 3:
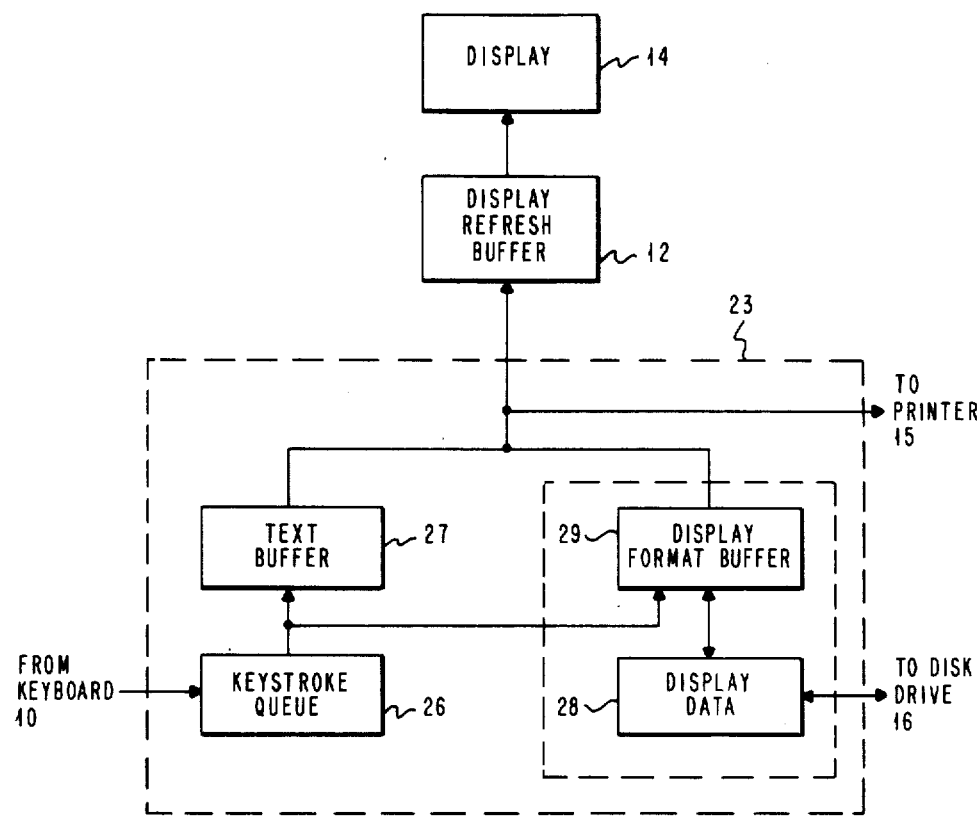
FIG. 3 is a functional diagram illustrating the data flow path between portions of the memory and the microprocesor and the display refresh buffer.

Functionally, memory unit 23 stores both instructions and data in specified sections which will be described in more detail later in the specification. Data is entered into memory 23 from the keyboard 10 as bytes of binary information through input port 21. As shown in FIG. 3, the section of RAM 23 which receives the keystroke data from the keyboard 10 is designated keystroke queue 26. Data to be displayed is transferred by a series of instructions from queue 26 to the text buffer section 27 and then to the display refresh buffer 12 through output port 22 of the microprocessor 11. This is achieved in a conventional way by the microprocessor 11 executing a series of move instructions.

The microprocessor 11 may be an IBM Series 1, INTEL model 8086, or any of the recognized functionally equivalent, currently available microprocessors.

The display refresh buffer 12 is shown as a separate buffer connected between the output port 22 and the display device 14. Buffer 12, in practice, is normally a part of the display device 14 and functions to control the generation of characters on the screen of the display device 14 by exercising on-off control of the beam as it traces a series of horizontal lines across the screen.

The output port 22 also supplies data stored in memory 23 to the printer 15 and disk storage unit 16, each of which may have their own internal buffers which are not shown. Commands to transfer data from the random access memory 23 to the printer 15 or storage unit 16 are sent to the microprocessor 11 by the operator from the keyboard 10.

Printer 15 may be any suitable printer known in the art. In most text processing systems, the printer 15 is basically a standard input/output terminal printer having a type ball element or a daisy-wheel print element.

Disk storage 16 may also be any suitable disk storage device which is capable of storing serial by byte data supplied to it at determined sector address locations, each of which are randomly addressable by the microprocessor 11 to retrieve the data. Spatially related data supplied from disk drive 16 is stored in the display data area 28 of the memory 23 in encoded form. Another section of memory 23 shown in FIG. 3 is the display format buffer area 29 which is involved in the handling of spatially related data in decoded form in accordance with the method of the present invention.

Figure 4:
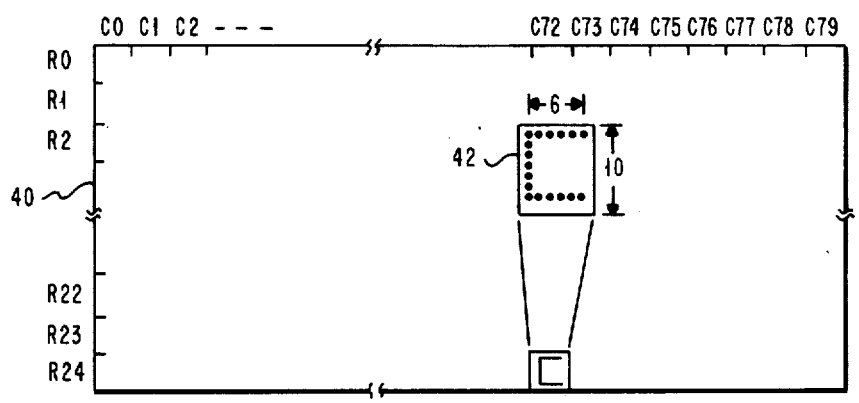
FIG. 4 is a diagrammatic view of the display shown in FIG. 1.

FIG. 4 is a schematic representation of the screen 40 of display device 14. As shown in FIG. 4, the screen 40 has, for example, the capability of displaying 25 lines of characters where each line consists of 80 character column positions. In practice, one character position consists of a matrix of dot positions or picture elements sometimes referred to as pels. A typical character matrix for a display of the type represented by device 14 would be a matrix of six wide by ten high pels, which has been designated by reference character 42 in FIG. 4. The interaction of the refresh buffer 12 and the display 14 is to convert the characters stored at a location in the buffer 12 to the corresponding character as formed in a 6×10 dot matrix at the equivalent location on the display screen 40. Display 14 generally is provided with its own set of electronics to achieve that conversion. The microprocessor 11 need only supply the address and load the buffer 12 with the appropriate characters.

The disk storage device 16 also is generally provided with its own set of electronics for converting a byte of data supplied from the display data area 28 of memory 23 through the output port 22 to a serial by bit stream of data to be recorded at a predetermined sector of the one addressed concentric recording track on the disk. Data from the device 16 is supplied to the microprocessor 11 serial by byte from the addressed sector and storage tracks when requested.

It will be understood that all of the above described functions and interactions involving the microprocessor 11 are achieved through suitable programs and data which are also stored in memory 23 shown as memory blocks 30, 31, 32, 33 and 34 of FIG. 2 and which are called into operation in response to data from the keyboard 10 or interrupt signals generated by the various components of the system shown in FIG. 1.

The preferred embodiment of the present invention comprises a set of instructions or programs for controlling a text processing system for reviewing the input screen of words or data segments against the entries in a confusable word list in memory 31 until a match is found. The match condition against a word from the list causes the processor 11 under control of the instructions in memory 30 to flag the word and apply rules associated with the word. This processing may involve interaction with the contents of the parts of speech information in memory 33 and/or with the special word lists in memory 32 and the RAM memory 23. The processing continues under the control of the instructions of this invention until a conclusion can be drawn as to whether conditions are met in the immediate region of the previously flagged word to accept its use. If the conditions are met then no further processing of the flagged word is performed. However, if the conditions are not met, the processor 30 will obtain from memory 34 the alternate words and definitions related to the flagged word and display them to the operator. Flagging the word may be done by displaying the word in reverse video, underscoring the word, boxing the word, etc.

The confusable words are stored in sets in the memory section 31. Table 1 shows a sample listing of confusable words which are stored in the memory 31. Each set of confusable words has a related set of definitions shown in Table 2 and stored in memory 34. The sets of confusable words and definitions represent popular usage and definitions for the words.

TABLE 1

| Partial List of Confusable Words | | | |
|---|---|---|---|
| **** | accept | **** | desert |
|  | except |  | dessert |
| **** | access | **** | formally |
|  | excess |  | formerly |
| **** | affect | **** | heal |
|  | effect |  | heel |
|  |  | **** | hear |
| **** | assistance |  | here |
|  | assistants | **** | instants |
| **** | ballad |  | instance |
|  | ballet | **** | later |
|  | ballot |  | latter |
| **** | bear | **** | pain |
|  | bare |  | pane |
| **** | brake | **** | pair |
|  | break |  | pare |
|  |  |  | pear |
| **** | breach | **** | precedence |
|  |  |  | precedents |
|  | breech |  | presidents |
| **** | cite | **** | saver |
|  | site |  | savor |
|  | sight | **** | stationary |
| **** | coarse |  | stationery |
|  |  | **** | to |
|  | course |  | too |
|  |  |  | two |
| **** | confidant | **** | vane |
|  |  |  | vein |
|  | confident |  | vain |
| **** | decent |  |  |

TABLE 1-continued

Partial List of Confusable Words

| | |
|---|---|
| descent | **** weak |
| dissent | week |

TABLE 2

Partial List of Definitions

| | |
|---|---|
| **** (receive, understand) (exclude, object) | **** (dry land) (food) |
| **** (right to use) (oversupply, too much) | **** (conventionally) (before now) |
| **** (act upon or influence) (result of action or to bring about) | **** (mend) (of foot) |
| **** (help) (people who help) | **** (with the ear) (this place) |
| **** (song, poem) (dance) (ticket) | **** (moments) (example) |
| **** (an animal, to carry) (naked, empty) | **** (afterwards) (the last one) |
| **** (slow down, a thicket) (opening, to part, rest period) | **** (ache) (window) |
| **** (infraction, breakthrough) (part of a firearm) | **** (a couple, two) (to peel) (a fruit) |
| **** (summons) (place) (view) | **** (priority of rank) (previous laws) (heads of state) |
| **** (crude, large particles) (path, as might be expected) | **** (one who saves) (taste, scent) |
| **** (one to whom secrets are entrusted) (certain, trustful) | **** (fixed) (paper supplies) |
| **** (good) (go down) (disagreement) | **** (toward) (also) (2) |
| | **** (weathercock) (blood vessel) (proud, unsuccessful, worthless) |
| | **** (feeble) (7 days) |

The rules for testing the confusable words are shown in Table 3 and stored in the memory section 32 as special words. The confusable word identified in text along with predefined sections of text preceding the confusable word and following the confusable word are examined to determine whether the confusable word is misused. It has been determined that a string of 11 words generally provides sufficient information to determine whether a word has been used properly. The confusable word is positioned as the "pivot" word in the string with 5 preceding and 5 following words. The rules in memory section 32 provide means for inspecting the text surrounding the pivot word for specific words, words ending in specific characters, words terminated by a blank, comma, or period, words which are a particular part of speech, capitalized words, numbers, or proper nouns.

TABLE 3

Special Words

| xxx | Implemented Rule Operands |
|---|---|
| = "xxxxx" | The word exactly matches the string within the quotes. |
| = NOUN | |
| = PRONOUN | |
| = ADJECTIVE | |
| = VERB | The word matches the part of speech. |
| = ADVERB | |
| = CONJUNCTION | |
| = PREPOSITION | |
| = @ + "xxx" | The word ends with the string within the quotes. |
| = @ − "xxx" | The word begins with the string within |

TABLE 3-continued

Special Words

| | the quotes. |
|---|---|
| = PERIOD | The word is delimited by a period. |
| = COMMA | The word is delimited by a comma. |
| = BLANK | The word is delimited by a blank. |
| = NUMERIC | The word is numeric. |
| = CAPITAL | The word is capitalized. |
| = NAME | The word is a proper name (not in the dictionary). |

*** This is word set number 1, and is referenced by '#1'.

| a | the | them | these |
|---|---|---|---|
| an | that | this | those |

*** This is word set number 2, and is referenced by '#2'.

| my | his | its | their |
|---|---|---|---|
| her | our | your | |

*** This is word set number 3, and is referenced by '#3'.

| can | must | would | should |
|---|---|---|---|
| may | need | could | shall |
| did | needs | might | will |
| please | | | |

*** This is word set number 4, and is referenced by '#4'.

| I | your | it | they |
|---|---|---|---|
| we | he | she | |

*** This is word set number 5, and is referenced by '#5'.

| zero | three | six | nine |
|---|---|---|---|
| one | four | seven | ten |
| two | five | eight | eleven |
| twelve | | | |

*** This is word set number 6, and is referenced by '#6'.

| January | April | July | October |
|---|---|---|---|
| February | May | August | November |
| March | June | September | December |

*** This is word set number 7, and is referenced by '#7'.

| Sunday | Tuesday | Thursday | Saturday |
|---|---|---|---|
| Monday | Wednesday | Friday | |

*** This is word set number 8, and is referenced by '#8'.

| me | him | you | |
|---|---|---|---|
| us | her | them | |

*** This is word set number 9, and is referenced by '#9'.

| is | be | was | were |
|---|---|---|---|
| are | been | am | |

*** This is word set number 10, and is referenced by '#10'.

| first | fourth | seventh | tenth |
|---|---|---|---|
| second | fifth | eighth | eleventh |
| third | sixth | ninth | twelfth |

Each set of confusable words has stored in the memory 32 rules specific to each member of the set. These follow the general rules in the memory 32 and serve as pointers to the applicable general rules for each word. The specific rules for a sample set of confusable words is shown in Table 4. The "−" designations in the rules indicates that the word following the equal sign is tested for preceding the confusable word. For example, −1 = "please" translates to "please accept" for the first word in Table 4. The "+" designation indicates that the term following the equal sign will be tested for following the confusable word. For example, "+1 = PRONOUN means the word immediately following the confusable word (pivot word) will be examined to determine if it is a pronoun. This determination is made by examining the word against a dictionary of correctly spelled words stored in the RAM 23 in accordance with the teachings of U.S. Pat. No. 3,995,254 issued to Nov. 30, 1976 to W. S. Rosenbaum wherein the dictionary includes an additional code appended to each word to indicate its part of speech. The rule +1 = #1 means that the word immediately following the pivot word will be examined to determine if it matches one of the words in set number 1 of Table 3.

As previously stated, a string of words surrounding the pivot word may be examined. This means that the rule may contain compound conditions. Compound conditions preceding the pivot word are designated as −1 followed by −2, −3, etc. For example, the last two terms in the rules for "course" are −1='the' and −2='in'. This translates to "in the course". Likewise, compound conditions following the pivot word are designated as +1 followed by +2, +3, etc. It follows that the rule condition may also be negative as well as positive. For example, satisfaction of a rule condition may require rejection of the pivot word's use rather than acceptance.

TABLE 4

| | Word Rules |
|---|---|
| accept | −1 = 'please' |
| | −1 = 'not' |
| | −1 = 'cannot' |
| | −1 = 'to' |
| | −1 = #3 |
| | −1 = @ + "ll" |
| | −1 = @ + "d" |
| | −1 = @ + 'n't' |
| | −1 = PRONOUN |
| | +1 = PRONOUN |
| | +1 = NOUN |
| | +1 = #1 |
| except | +1 = 'for' |
| | −1 = NOUN |
| | +1 = NOUN |
| | +1 = NAME |
| | +1 = #7 |
| | +1 = #8 |
| access | +1 = 'to' |
| | −1 = 'to' |
| | −1 = 'direct' |
| | −1 = 'indirect' |
| | −1 = ADJECTIVE |
| | +1 = NOUN |
| | −1 = PRONOUN |
| | +1 = VERB |
| excess | −1 = 'an' |
| | −1 = 'in' |
| | +1 = 'of' |
| | +1 = 'of' |
| affect | −1 = 'to' |
| | −1 = 'not' |
| | −1 = 'may' |
| | −1 = 'will' |
| | −1 = ADVERB |
| | +1 = #1 |
| effect | −1 = 'in' |
| | −1 = 'into' |
| | −1 = #1 |
| | +1 = 'of' |
| | −1 = 'one' |
| | −1 = ADJECTIVE |
| ... | |
| ... | |
| ... | |
| attendance | +1 = 'is' |
| | +1 = 'was' |
| | −1 = #2 |
| | +1 = PREPOSITION |
| | −1 = PREPOSITION |
| attendants | −1 = ADJECTIVE |
| | −1 = NUMERIC |
| ... | |
| ... | |
| ... | |
| ballad | +1 = 'of' |
| ballet | −1 = CAPTIAL |
| | +1 = CAPITAL |
| ballot | +1 = 'box' |
| balm | −1 = 'soothing' |
| bomb | −1 = 'a' |
| | −1 = 'h' |
| | −1 = 'n' |
| | −1 = 'atomic' |
| | −1 = 'neutron' |
| | −1 = 'hydrogen' |
| | −1 = 'nuclear' |

TABLE 4-continued

| | Word Rules |
|---|---|
| | −1 = 'terrorist' |
| | −1 = 'to' |
| | −1 = 'lb.' |
| | +1 = 'explosion' |
| | +1 = 'damage' |
| | +1 = 'load' |
| | +1 = 'blast' |
| | +1 = 'run' |
| ... | |
| ... | |
| ... | |
| brake | −1 = front' |
| | −1 = 'rear' |
| | −1 = 'emergency' |
| | +1 = 'lining' |
| | +1 = 'failure' |
| break | +1 = #1 |
| | +1 = 'in' |
| | +1 = 'into' |
| | −1 = 'to' |
| | +1 = 'point' |
| | −2 = 'for' |
| | −1 = #1 |
| | −2 = 'take' |
| | −1 = #1 |
| ... | |
| ... | |
| ... | |
| coarse | +1 = @ = 'language' |
| | +1 = @ − 'manner' |
| | +1 = @ − 'texture' |
| | +1 = @ − 'cloth' |
| course | −1 = 'of' |
| | −1 = 'due' |
| | −1 = 'mid' |
| | −1 = @ − 'change' |
| | +1 = @ − 'change' |
| | −1 = ADJECTIVE |
| | −1 = #1 |
| | −1 = #10 |
| | −1 = NUMERIC |
| | +1 = #NUMERIC |
| | +1 = 'of' |
| | −1 = 'the' |
| | −2 = 'in' |
| confidant | −1 = 'personal' |
| | −2 = #2 |
| confident | −1 = #9 |
| | −1 = 'very' |
| | −1 = ADVERB |
| ... | |
| ... | |
| ... | |

Referring now to FIG. 5, there is shown an example of a letter displayed on the screen 40 of the display 14. The display has highlighted the words "affect", "confidant" and "coarse" as possible misused words. In operation, the contextual error detection and correction function may be invoked in a text processing system through a conventional "menu" task selection function such as disclosed in U.S. Pat. No. 4,308,582, issued Dec. 29, 1981 to David A. Berger and assigned to International Business Machines Corp.

In a menu task selection function, the text processing system displays to the operator a menu of functions that the system can perform. The operator may then select one or a combination of such functions through operation of cursor control and select or enter keybuttons on the system keyboard 10. For example, functions to paginate, check spelling, hyphenate for formatting, and check contextual errors in a document could be invoked singularly or in any combination. As an alternative to menu task selection, the text processing system could be provided with a separate keybutton to invoke each of the functions that the system is capable of performing.

At any rate, once invoked, the contextual error routine sequentially scans each word in the text document and compares the words to the confusable words stored in the confusable word memory 31. A program listing for the main context analyzer routine is shown in Table 5 in pseudo code. The application and use of pseudo code is described in "An Introduction to Programming", (A Structural Approach Using PL/1 and PL/C-7), Second Edition, by Richard Conway and David Gries, Winthrop Publishers, Cambridge, Mass., Copyright 1975.

TABLE 5
---
BEGINSEGMENT (CONTEXT)
ENTER CONTEXT, USING PARAMETER LIST;
SAVE THE ENTRY REGISTERS;
IF ENTERED FOR INITIALIZATION, THEN
OBTAIN ACCESS TO STORAGE FILE FOR CONFUSABLE
WORDS; OBTAIN ACCESS TO STORAGE FILE FOR
PARTS OF SPEECH; OBTAIN ACCESS TO STORAGE
FILE FOR SPECIAL WORDS LIST;
OBTAIN ACCESS TO STORAGE FILE FOR DEFINITIONS;
GET MAIN STORAGE SPACE FOR PARTS OF SPEECH LIST
AND
RECORD ADDRESS IN SCRATCH PAD;
GET MAIN STORAGE SPACE FOR SPECIAL WORDS LIST
AND
RECORD ADDRESS IN SCRATCH PAD;
BUILD PARTS OF SPEECH LIST IN MAIN STORAGE;
BUILD SPECIAL WORDS LIST IN MAIN STORAGE;
BUILD CONFUSABLE WORDS LIST IN MAIN STORAGE;
BUILD DEFINITIONS LIST IN MAIN STORAGE;
RELINQUISH ACCESS TO STORAGE FILE;
IF INITIALIZATION WAS NOT SUCCESSFUL, THEN
SET RETURN CODE FOR CALLER;
ENDIF;
ENDIF;
IF ENTERED TO JUDGE SUITABLE USE OF WORD, THEN
DO UNTIL END OF DOCUMENT
IF WORD IS FOUND IN CONFUSABLE WORDS LIST, THEN
CALL (RULESCK)
TO APPLY ACCEPTANCE/REJECTION RULES FOR WORD;
IF WORD IS JUDGED TO BE USED INCORRECTLY, THEN
FLAG WORD IN DISPLAY BUFFER AND IN PARAMETER
LIST AS UNACCEPTABLE;
ENDIF;
ENDIF;
ENDDO
ENDIF;
IF ENTERED TO OBTAIN POTENTIAL SUBSTITUTION
WORDS AND DEFINITIONS, THEN
DO FOR EACH WORD FLAGGED ON DISPLAY AND IN
PARAMETER LIST
CALL (PROMPTPREP)
TO CONSTRUCT SUBSTITUTE WORDS AND SHORT
DEFINITIONS;
DISPLAY WORDS AND DEFINITIONS IN DISPLAY LIST;
SUBSTITUTE CURSORED WORD IN DISPLAY LIST FOR
FLAGGED WORD IN DISPLAY BUFFER AND PARAMETER
LIST;
SET RETURN CODE FOR CALLER;
ENDDO;
ELSE
RELEASE MAIN STORAGE OBTAINED FOR SPECIAL
WORDS LIST;
RELEASE MAIN STORAGE OBTAINED FOR CONFUSABLE
WORDS LIST;
ENDIF;
RETURN
(TO CALLER WITH UPDATED PARAMETER LIST)
ENDSEGMENT (CONTEXT)

As was previously stated, this routine is entered following a menu setup procedure which is overseen by the system control program which operates in a manner similar to that described in U.S. Pat. No. 4,308,582, previously referenced. The main context analyzer routine of Table 5 is structured to control the processor 11 to access from the disk storage file 16 the confusable words file, special words list file, parts of speech file, and definitions file and store these files in the sections 31, 32, 33 and 34 of the random access memory 23. In conventional information processing systems, program instructions and data are typically stored in direct access storage devices such as diskette and disk files until needed in the system random access memory. However, where the system random access memory size permits, the program instructions and data may be permanently stored in system electronic read-only memory or stored in system random access memory during initial program load.

Once the confusable words, special words, parts of speech and definitions have been stored in the memory sections 31, 32, 33 and 34 respectively, the context routine scans the displayed document word-by-word in the display refresh buffer 12 and compares each word to the words in the confusable words list. When a word in a document is found to match a word in the confusable words list then the context routine invokes the rules check routine shown in Table 6 to determine whether the word is properly used by comparing the context of the word with the rules in the special words memory 32. For example, referring to FIG. 5, the word "affect" is potentially misused in the second paragraph of the letter on display screen 40. The rules for determining the proper usage of affect are shown in Table 4. A comparison of the rules shown in Table 4 and stored in memory section 33 to the context surrounding affect in FIG. 5 shows no matches. This causes the rules check subroutine to set a condition to reject the use of the word "affect" and return control to the context routine where the word is flagged on the display and in the parameter list as having unacceptable use. The flagging on the display screen takes the form of boldface so the word can be easily located on the display screen by the operator. Alternatively, the word may be overstruck, or underscored, or enclosed in a box, or any other suitable means of highlighting the word on the display screen.

TABLE 6
---
BEGINSEGMENT (RULESCK)
ENTER RULESCK, USING PARAMETER LIST AND CONFUSABLE WORDS LIST ADDRESS FOR SELECTED
WORD;
WHILE
NOT END OF RULES
IF ADDRESS OF WORD RELATING TO RULE EXISTS IN
PARAMETER LIST, THEN
MOVE WORD RELATING TO RULE TO WORK AREA IN
SCRATCH PAD;
IF RULE APPLIES TO SPECIAL WORDS LIST, THEN
LOCATE SPECIAL WORDS LIST ADDRESS IN MEMORY;
IF WORD IN WORK AREA MATCHES WORD IN SPECIAL
WORDS LIST, THEN
MAKE NOTATION THAT RULE WAS TRUE;
ELSE
MAKE NOTATION THAT RULES WAS FALSE;
ENDIF;
ENDIF;
IF RULE APPLIES TO LITERAL, THEN
IF WORD IN WORK AREA MATCHES LITERAL
CHARACTERS
IN RULE ELEMENT, THEN
MAKE NOTATION THAT RULE WAS TRUE;
ELSE
MAKE NOTATION THAT RULE WAS FALSE;
ENDIF;
ENDIF;
IF RULE APPLIES TO PREFIX, THEN
IF FIRST CHARACTERS OF WORD IN WORK AREA MATCH

TABLE 6-continued
BEGINSEGMENT (RULESCK)

```
PREFIX CHARACTERS IN RULE ELEMENT, THEN
MAKE NOTATION THAT RULE WAS TRUE;
ELSE
MAKE NOTATION THAT RULE WAS FALSE;
ENDIF;
ENDIF;
IF RULE APPLIES TO SUFFIX, THEN
IF LAST CHARACTERS OF WORD IN WORK AREA MATCH
SUFFIX CHARACTERS IN RULE ELEMENT, THEN
MAKE NOTATION THAT RULE WAS TRUE;
ELSE
MAKE NOTATION THAT RULE WAS FALSE;
ENDIF;
ENDIF;
IF RULE APPLIES TO PART OF SPEECH, THEN
IF WORD IN WORK AREA IS PART OF SPEECH REQUIRED
BY RULE, THEN
MAKE NOTATION THAT RULE WAS TRUE;
ELSE
MAKE NOTATION THAT RULE WAS FALSE;
ENDIF;
IF RULE APPLIES SPECIAL HANDLING, THEN
IF RULE APPLIES TO NAME, THEN
IF PART OF SPEECH FOR WORD IN WORK AREA
CANNOT BE DETERMINED, THEN
MAKE NOTATION THAT RULE WAS TRUE;
ELSE
MAKE NOTATION THAT RULE WAS FALSE;
ENDIF;
ENDIF;
IF RULE APPLIES TO BLANK, THEN
IF WORD IN WORK AREA IS DELIMITED BY BLANK
CHARACTER, THEN
MAKE NOTATION THAT RULE WAS TRUE;
ELSE
MAKE NOTATION THAT RULES WAS FALSE;
ENDIF;
ENDIF;
IF RULE APPLIES TO COMMA, THEN
IF WORD IN WORK AREA IS DELIMITED BY COMMA
CHARACTER, THEN
MAKE NOTATION THAT RULE WAS TRUE;
ELSE
MAKE NOTATION THAT RULE WAS FALSE;
ENDIF;
ENDIF;
IF RULE APPLIES TO PERIOD, THEN
IF WORD IN WORK AREA IS DELIMITED BY
PERIOD CHARACTER, THEN
MAKE NOTATION THAT RULE WAS TRUE;
ELSE
MAKE NOTATION THAT RULE WAS FALSE;
ENDIF;
ENDIF;
IF RULE APPLIES TO NUMERIC, THEN
IF WORD IN WORK AREA IS NUMERIC, THEN
MAKE NOTATION THAT RULE WAS TRUE;
ELSE
MAKE NOTATION THAT RULE WAS FALSE;
ENDIF;
ENDIF;
IF RULE APPLIES TO CAPITAL, THEN
IF FIRST CHARACTER OF WORD IN WORK AREA IS
UPPER CASE, THEN
MAKE NOTATION THAT RULE WAS TRUE;
ELSE
MAKE NOTATION THAT RULE WAS FALSE;
ENDIF;
ELSE
MAKE NOTATION THAT RULE WAS FALSE;
ENDIF;
ELSE
MAKE NOTATION THAT RULE WAS FALSE;
ENDIF;
ELSE
MAKE NOTATION THAT RULE WAS FALSE;
ENDIF;
IF RULE IS INDEPENDENT OF OTHER RULES, THEN
IF RULE IS TRUE, THEN
IF RULE RELATES TO EQUAL CONDITION, THEN
SET RETURN CONDITION TO ACCEPT WORD;
ELSE
SET RETURN CONDITION TO REJECT WORD;
ENDIF;
ENDIF;
ELSE
IF RULE RELATES TO NOT EQUAL CONDITION, THEN
IF RULE STATES ACCEPT, THEN
SET RETURN CONDITION TO ACCEPT WORD;
ELSE
SET RETURN CONDITION TO REJECT WORD;
ENDIF;
ENDIF;
ENDIF;
IF RULE IS FIRST OF A MULTI-RULE SET, THEN
RESET INDEX TO MULTI-RULE CONDITION AREA IN
SCRATCH PAD;
ENDIF;
SET INDEXED MULTI-RULE CONDITION AREA TO
NEGATIVE VALUE;
IF RULE RELATES TO EQUAL CONDITION, THEN
IF RULE WAS TRUE, THEN
SET INDEXED MULTI-RULE CONDITION AREA TO
POSITIVE VALUE;
ENDIF;
ELSE
IF RULE WAS FALSE, THEN
SET INDEXED MULTI-RULE CONDITION AREA TO
POSITIVE VALUE;
ENDIF;
ENDIF;
IF RULE IS LAST OF A MULTI-RULE SET, THEN
IF MULTI-RULE CONDITION AREA TO EXTENT OF INDEX
IS POSITIVE, THEN
SET RETURN CONDITION TO ACCEPT WORD;
ENDIF;
ELSE
INCREMENT INDEX TO MULTI-RULE CONDITION AREA;
ENDIF;
IF CONDITION NOT SET TO ACCEPT WORD, THEN
ESTABLISH POINTER TO APPLY NEXT RULE FOR WORD;
ELSE
RETURN TO CALLER WITH CONDITION SET TO ACCEPT
WORD;
ENDIF;
ENDIF;
ENDDO;
ENDWHILE;
RETURN TO CALLER WITH CONDITION SET TO REJECT
WORD;
ENDSEGMENT (RULESCK)
```

The context routine continues to scan the document word-by-word until each word in the document has been checked against the confusable word list. As can be seen in FIG. 5, the words "confidant" in the third paragraph and "coarse" in the last paragraph are also highlighted (flagged) as being potentially misused.

When the end of the document is reached, the main context routine scans to determine if any confusable words were identified. If confusable words were identified as appearing in the document the context routine invokes the prompt preparation routine shown in Table 7 to display the confusable words and definitions for the potentially misused word. Referring to FIG. 6, the confusable words "affect" and "effect" along with their short definitions are shown in bold-face and surrounded by a dotted line rectangle following the second paragraph of the document. The operator can select the proper word for substitution into the document in place of the highlighted word by placing the display cursor underneath the word to be selected and pressing an enter key on the keyboard 10. The cursored word will then be substituted for the highlighted word in the text document and the program routine will proceed to display the confusable words and definitions for the next highlighted word in text. The routine then continues processing the highlighted words until the end of the document is reached.

TABLE 7

BEGINSEGMENT (PROMPTPREP)

ENTER PROMPTPREP, USING PARAMETER LIST AND CONFUSABLE WORDS LIST ADDRESS FOR SELECTED WORD;
OBTAIN ADDRESS TO BUILD WORD/DEFINITION LIST IN PARAMETER LIST;
OBTAIN RELATIVE RECORD ADDRESS OF RELATED WORD SET FROM CONFUSABLE WORDS LIST ENTRY;
WHILE
NOT LAST WORD OF RELATED SET;
DO
READ NEXT RECORD FROM CONFUSABLE WORDS LIST AND DEFINITIONS LIST;
INCLUDE WORD AND DEFINITION IN PARAMETER LIST TO RETURN TO CALLER;
ENDDO;
ENDWHILE;
RETURN TO CALLER;
ENDSEGMENT (PROMPTPREP);

While the invention has been particularly shown and described with reference to a preferred embodiment, it will be understood by those skilled in the art that various changes in form and detail may be made without departing from the spirit and scope of the invention.

We claim:

1. The method of detecting homophone contextual errors in a string of data segments in an information processing system comprising:

(a) storing a table of homophones, each homophone having stored therewith a set of contextual usage rules specific thereto and at least one of said homophones having stored therewith one or more pointers to a table of other sets of contextual usage rules;

(b) scanning asid string for one of said homophones stored in said table of homophones;

(c) detecting a homophone in said string;

(d) accessing said contextual usage rules and any of said one or more pointers stored with said detected homophone, using said one or more pointers accessing any contextual usage rules in said table of other sets of contextual usage rules associated with said homophone;

(e) comparing data segments surrounding said homophone with said accessed contextual usage rules associated with said homophone; and (f) indicating to an operator of said information processing system that a homophone has been found whose contextual usage rules do not compare with said data segments surrounding said homophone.

2. The method of detecting homophone contextual errors of claim 1 further comprising:

(g) displaying at least one alternative homophone related to said homophone indicated to said operator.

3. The method for detecting homophone contextual errors of claim 2 wherein said step of displaying at least one alternative homophone includes displaying a definition for each displayed alternative homophone.

4. The method for detecting homophone contextual errors of claim 3 wherein said step of displaying at least one alternative homophone related to said homophone indicated to said operator includes displaying said alternative homophone in a highlighted format.

5. The method for detecting homophone contextual errors of claim 4 wherein said step of indicating to said operator that said homophone has been found includes displaying said homophone in boldface.

6. The method of detecting homophone contextual errors of claim 5 further comprising:

(h) replacing said highlighted homophone in said string with one said atlernative homophone chosen by said operator.

* * * * *